(12) United States Patent
Sato

(10) Patent No.: US 6,652,299 B2
(45) Date of Patent: Nov. 25, 2003

(54) CARD CONNECTOR

(75) Inventor: Shigeru Sato, Chiba (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/978,660

(22) Filed: Oct. 18, 2001

(65) Prior Publication Data

US 2002/0055287 A1 May 9, 2002

(30) Foreign Application Priority Data

Oct. 19, 2000 (JP) ........................................ 2000-319891

(51) Int. Cl.⁷ ............................................... H01R 13/62
(52) U.S. Cl. ...................................... 439/159; 439/152
(58) Field of Search ................................ 439/152, 153, 439/157, 159, 160, 326

(56) References Cited

U.S. PATENT DOCUMENTS

| 4,810,200 A | 3/1989 | Sakamoto | 439/155 |
| 4,952,161 A | 8/1990 | Komatsu | 439/155 |

(List continued on next page.)

FOREIGN PATENT DOCUMENTS

| JP | 3-46969 | 4/1991 |
| JP | 6-139415 | 5/1994 |
| JP | 7-192102 | 7/1995 |
| JP | 11-316110 | 11/1999 |
| JP | 2000-251024 | 9/2000 |
| JP | 2000-251025 | 9/2000 |
| JP | 2000-277207 | 10/2000 |

OTHER PUBLICATIONS

U.S. patent application Ser. No. 09/832,190, Takada et al., filed Apr. 11, 2001.
U.S. patent application Ser. No. 09/914,322, Sato, filed Aug. 27, 2001.
U.S. patent application Ser. No. 09/978,661, Sato, filed Oct. 18, 2001.
U.S. patent application Ser. No. 10/067,404, Ooya et al., filed Feb. 7, 2002.
U.S. patent application Ser. No. 10/090,153, Ito et al., filed Mar. 5, 2002.
U.S. patent application Ser. No. 10/102,826, Sato et al., filed Mar. 22, 2002.
U.S. patent application Ser. No. 10/102,928, Abe, filed Mar. 22, 2002.

*Primary Examiner*—Alexander Gilman
(74) *Attorney, Agent, or Firm*—Finnegan, Henderson, Farabow, Garrett & Dunner, L.L.P.

(57) ABSTRACT

A card connector comprises: an ejection mechanism having an ejection member for ejecting a card; a locking piece displaceable vertically of the connector housing and adapted to fix the ejection member, when the card is loaded, to restrict the movement of the ejection member in the card ejection direction; and an releasing means for unlocking the locking piece in response to the card ejection operation.

3 Claims, 12 Drawing Sheets

U.S. PATENT DOCUMENTS

| | | |
|---|---|---|
| 5,033,972 A | 7/1991 | Komatsu et al. |
| 5,051,101 A | 9/1991 | Komatsu .................... 439/159 |
| 5,145,389 A | 9/1992 | Okubo |
| 5,179,505 A | 1/1993 | Matsuo ...................... 361/395 |
| 5,197,894 A | 3/1993 | Koike |
| 5,286,207 A | 2/1994 | McHugh |
| 5,492,480 A | 2/1996 | Fusselman et al. |
| 5,492,481 A | 2/1996 | Lewis |
| 5,533,906 A | 7/1996 | Abe |
| 5,597,316 A | 1/1997 | David et al. ................. 439/159 |
| 5,640,307 A | 6/1997 | Bleier et al. ................ 361/740 |
| 5,648,651 A | 7/1997 | Inoue |
| 5,655,918 A | 8/1997 | Soh |
| 5,674,080 A | 10/1997 | Takemura |
| 5,695,351 A | 12/1997 | Kimura et al. |
| 5,703,346 A | 12/1997 | Bricaud et al. ............ 235/44.1 |
| 5,725,385 A | 3/1998 | Takano et al. |
| 5,740,012 A | 4/1998 | Choi |
| 5,871,365 A | 2/1999 | Kajiura ...................... 439/159 |
| 5,890,920 A | 4/1999 | David et al. |
| 5,899,763 A | 5/1999 | Kajiura |
| 5,923,541 A | 7/1999 | Yasumi |
| 5,967,810 A | 10/1999 | Spickler et al. |
| 6,065,984 A | 5/2000 | Tung |
| 6,083,018 A | 7/2000 | Hara et al. |
| 6,095,834 A | 8/2000 | Lai et al. |
| 6,106,313 A | 8/2000 | Chen |
| 6,120,309 A | 9/2000 | Hara |
| 6,139,340 A | 10/2000 | Niitsu |
| 6,152,748 A | 11/2000 | Sato et al. |
| 6,159,027 A | 12/2000 | Kuo |
| 6,162,075 A | 12/2000 | Hara et al. |
| 6,174,197 B1 | 1/2001 | Hirata et al. |
| 6,200,148 B1 | 3/2001 | Yu |
| 6,210,187 B1 | 4/2001 | Tung |
| 6,227,879 B1 | 5/2001 | Dong |
| 6,231,360 B1 | 5/2001 | Horie |
| 6,234,813 B1 | 5/2001 | Hanyu |
| 6,270,365 B1 | 8/2001 | Nishioka |
| 6,273,737 B1 | 8/2001 | Furusho et al. |
| 6,290,136 B1 | 9/2001 | Koseki et al. |
| 6,299,465 B1 * | 10/2001 | Hirata ........................ 439/159 |
| 6,302,715 B1 | 10/2001 | Sato et al. |
| 6,319,029 B2 | 11/2001 | Nishioka |
| 6,332,790 B1 | 12/2001 | Ishikawa et al. |
| 6,390,836 B1 | 5/2002 | Motegi et al. |
| 6,394,827 B2 | 5/2002 | Nogami |
| 6,398,567 B1 | 6/2002 | Nishimura |
| 6,398,827 B1 | 6/2002 | Ota et al. |

\* cited by examiner

WHEN CARD IS NOT LOADED

FIG. 6 WHEN CARD IS LOADED

WHEN EJECTION BUTTON IS PRESSED

WHEN EJECTION BUTTON IS PRESSED

CARD CONNECTOR

This application is based on Patent Application No. 2000-319891 filed Oct. 19, 2000 in Japan, the content of which is incorporated hereinto by reference.

BACKGROUND OF THE INVENTION

1. Field of the Invention

The present invention relates to a card connector mounted on electronic devices, such as cellular phones, telephones, PDAs (personal digital assistants), portable audio devices and cameras, and more specifically to a structure for locking a card ejection mechanism ejecting a card when the card is loaded.

2. Description of the Related Art

In electronic devices such as cellular phones, telephones, PDAs and cameras, a variety of functions are added by loading an IC card with a built-in CPU or memory IC, such as a SIM (subscriber identity module) card, an MMC (multimedia card) (trademark), an SD (super density) card, a Memory Stick (trademark) and a Smart Media (trademark).

The connector structure for removably accommodating such an IC card has a plurality of contact terminals in a connector housing that are connected to a variety of signal processing circuits and a power supply circuit of the electronic device on which the connector is mounted. These contact terminals are brought into contact with a plurality of contact pads formed on a front or back surface of the loaded IC card, causing the IC card to be electrically connected to the electronic device on which the connector is mounted.

Many of such card connectors have an ejection mechanism for withdrawing the loaded IC card from the connector. A proposed system of this ejection mechanism is shown in FIG. 13.

The card connector shown in FIG. 13 has an ejection member 102 urged in an ejection direction by coil springs 100 to eject a card 101, a looking piece 103 adapted to engage with a locking projection 102a formed at an end of the ejection member 102 to restrict the movement of the ejection member 102 in the ejection direction, and an ejection button 104 for releasing the restriction imposed by the locking piece 103 to allow the card to be ejected. At the locking piece 103 is formed an engagement hole 103a for fixing the locking projection 102a. The ejection button 104 is urged in the ejection direction by a coil spring 105. The ejection button 104 has a cam surface 104a that displaces a front end of the locking piece 103 in a lateral direction C.

In the construction described above, with the card 101 loaded in the connector and the ejection member 102 held immovable by the locking piece 103 as shown in FIG. 13, when the ejection button 104 is depressed, the pressing force from the cam surface 104a displaces the front end of the locking piece 103 away from the locking projection 102a, disengaging the ejection member 102 from the locking piece 103, with the result that the ejection member 102 moves in the ejection direction by the force of the coil springs 100, which allows the loaded card 101 to extrude out of the connector.

There is a growing demand on the card connector of this kind for size reduction as the electronic devices are becoming smaller and smaller. To meet this demand a variety of parts need to be laid out efficiently in a small space.

In the card connector described above, however, since the front end of the locking piece 103 is displaced in the lateral direction C of the connector housing, it is necessary to secure a space in which to displace the locking piece 103 laterally. Further, the cam surface 104a of the ejection button 104 needs to be extended in the lateral direction C, which results in an increase in the width of the connector housing in the lateral direction C and therefore there are some problems that the mounting area of the connector increases.

SUMMARY OF THE INVENTION

The present invention has been accomplished under these circumstances and its primary object is to provide a card connector which can reduce the width of its connector housing and therefore the card mounting area.

According to one aspect, the present invention provides a card connector for holding a card in a connector housing in such a way that a plurality of contact pads provided on a bottom surface of the card are in contact with contact terminals arranged in the connector housing. The card connector comprises: an ejection mechanism having an ejection member, the ejection member being adapted to move in a card insertion direction as the card is inserted into the connector housing, and move in a card ejection direction in response to a card ejection operation to eject the card; a locking piece displaceable vertically of the connector housing and adapted to fix the ejection member, when the card is loaded, to restrict the movement of the ejection member in the card ejection direction; and an releasing means for unlocking the locking piece in response to the card ejection operation.

As described above, because the locking piece for locking the ejection member is displaced vertically of the connector housing to lock or unlock the ejection member, the present invention makes it possible to reduce the width of the connector housing and therefore the mounting area of the connector housing.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, embodiments of the present invention will be described in detail by referring to the accompanying drawings.

Figure 1:
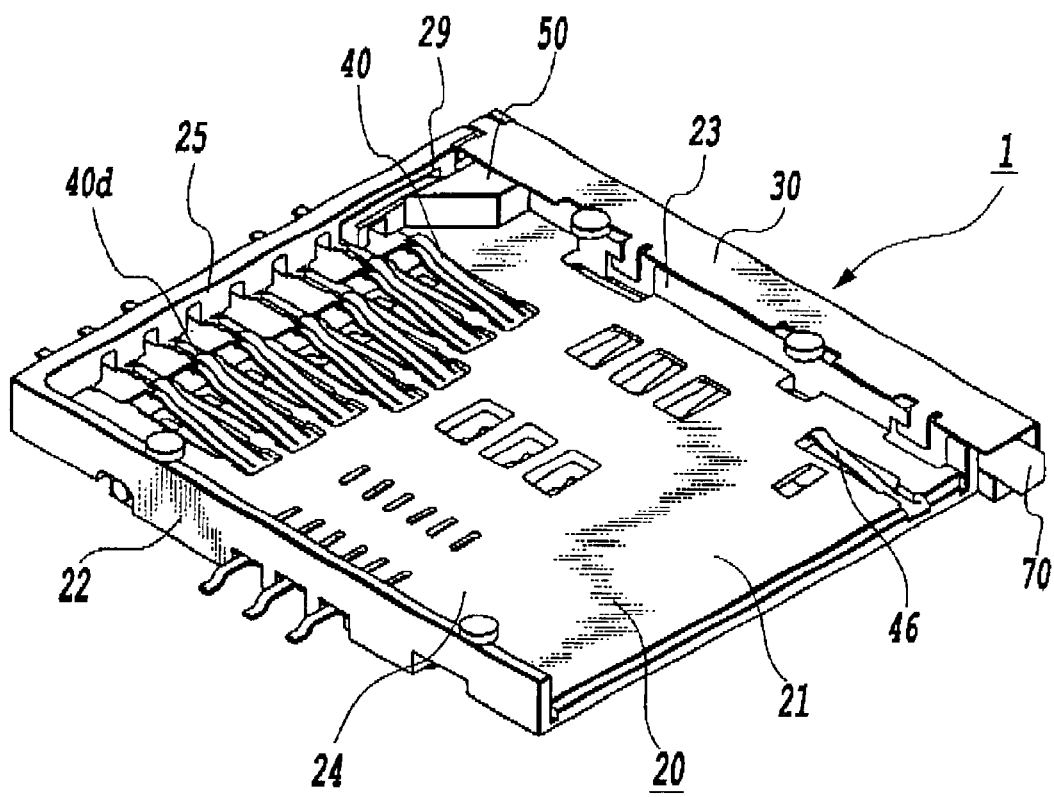
FIG. 1 is a perspective view showing an external construction of a card connector in one embodiment of the present invention.
Figure 2:
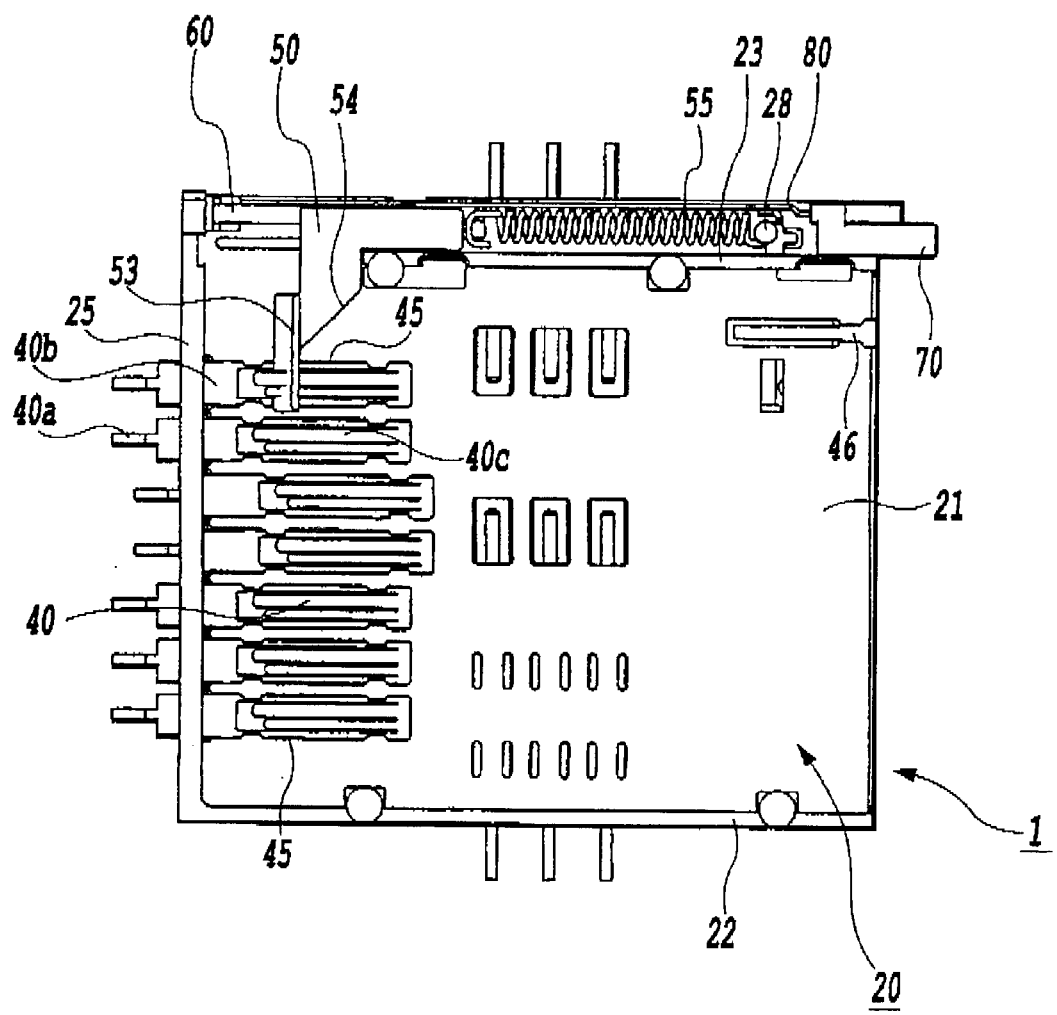
FIG. 2 is a plan view showing the condition of the card connector in the embodiment of the invention before a card is inserted.

FIG. 1 is a perspective view showing an external construction of the card connector. FIG. 2 is a plan view showing the construction of the card connector, with a cover 30 of an ejection portion (FIG. 1) taken away, before the card is inserted.

The card connector 1 is installed in electronic devices such as cellular phones, PDAs, portable audio devices and cameras.

Figure 3:
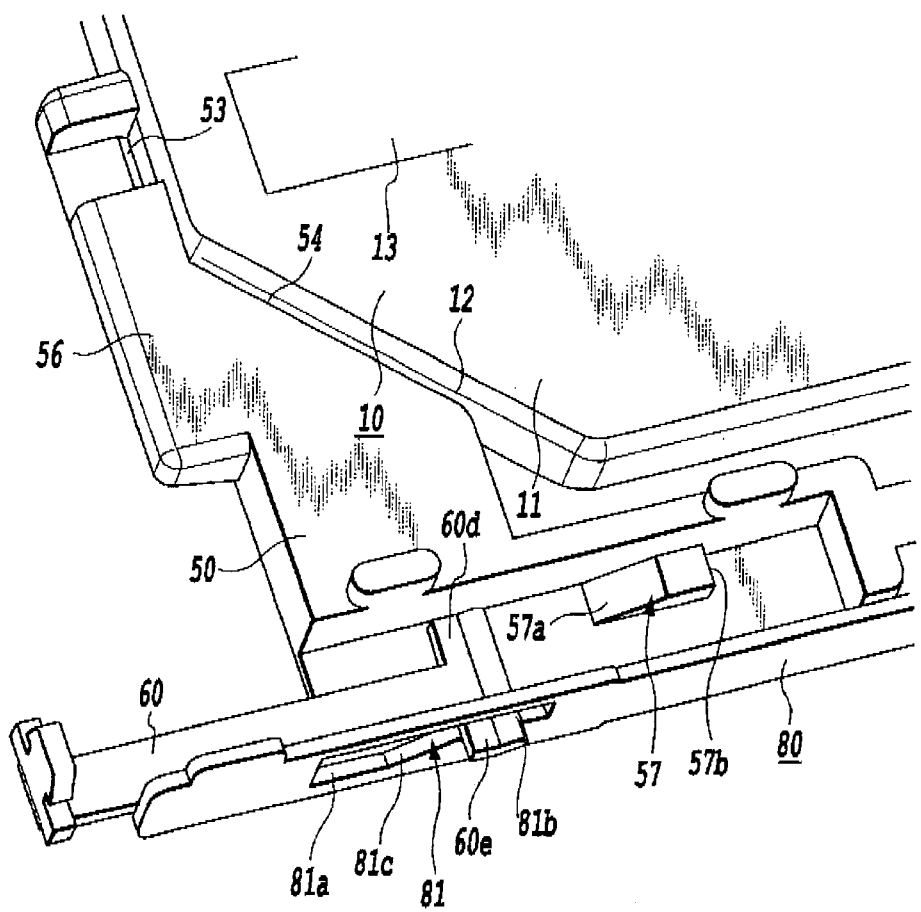
FIG. 3 is an enlarged perspective view showing an essential portion of an ejection mechanism of the card connector in the embodiment of the present invention as seen from the back.
Figure 7:
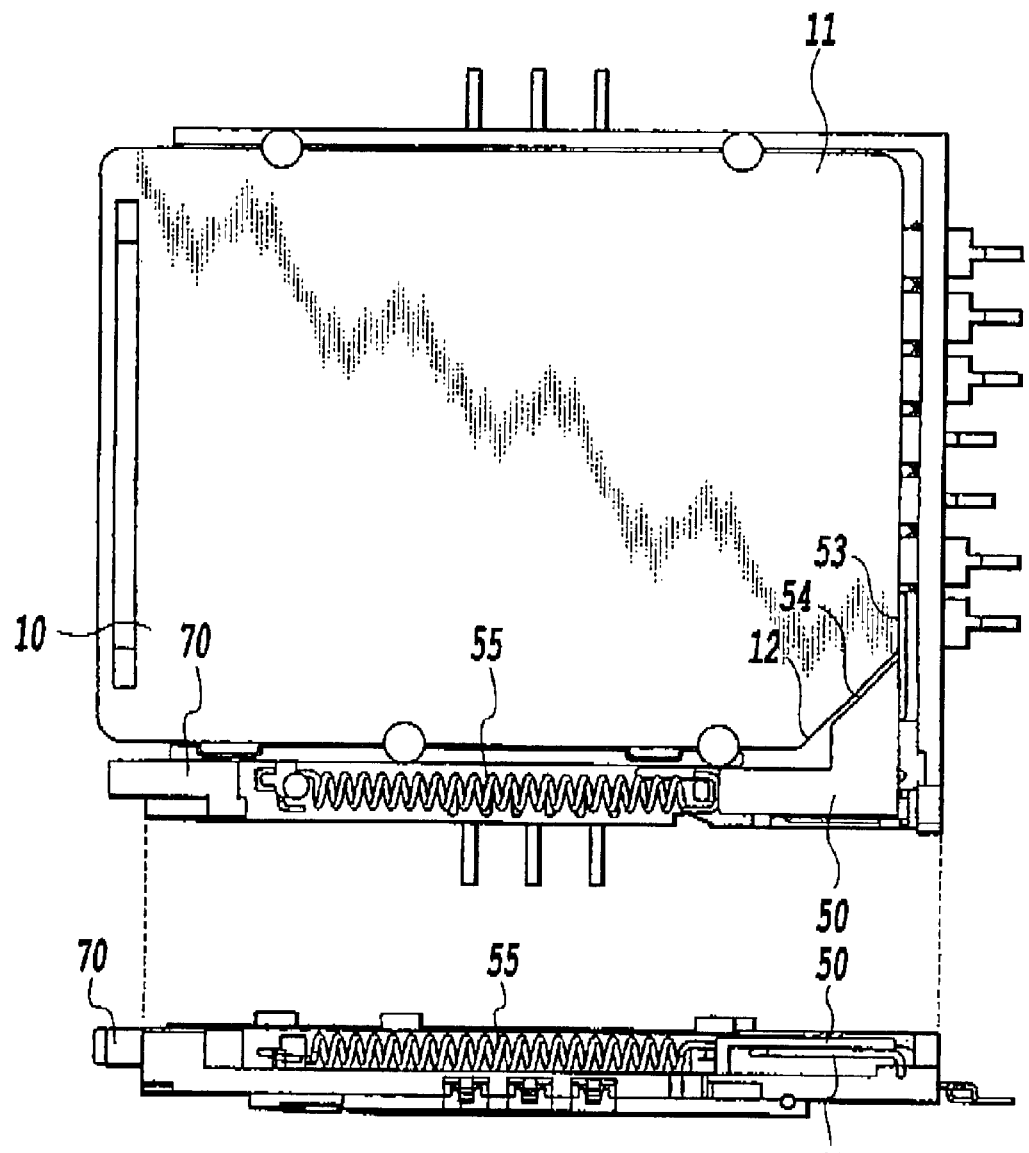
FIG. 7 is a plan view and a side view showing the condition of the card connector in the embodiment of the present invention when the card Is inserted.
Figure 12:
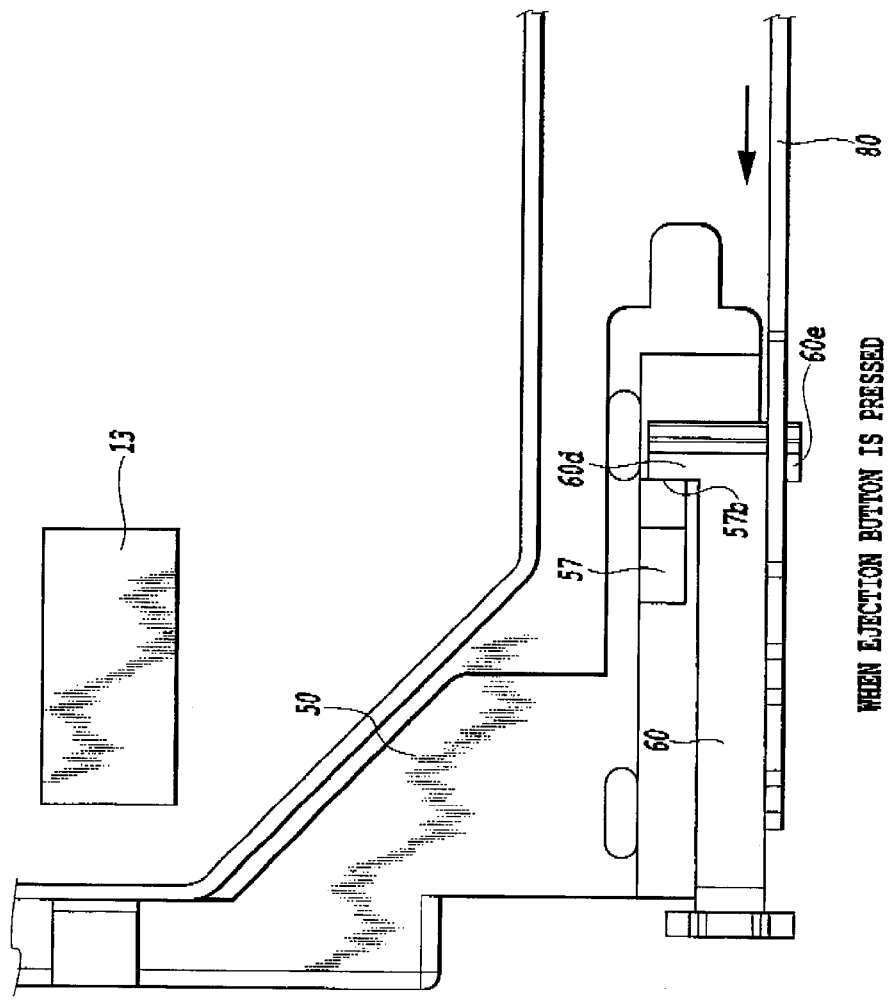
FIG. 12 is a horizontal cross-sectional view schematically showing the card connector in the embodiment of the present invention when the ejection button is pressed.
Figure 13:
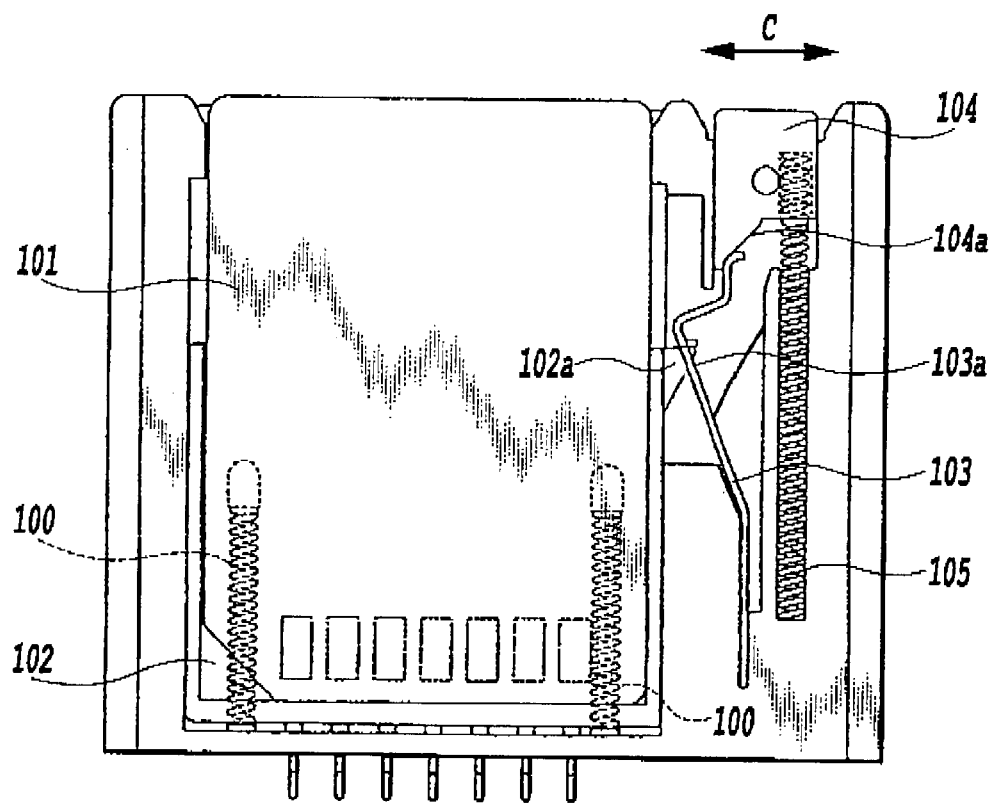
FIG. 13 is a plan view schematically showing a prior art.

An IC card 10 (hereinafter referred to also as a card 10), as shown in FIG. 3, FIG. 7 and FIG. 12, has a chamfer 12 at one front end corner of its body portion 11 for preventing an erroneous insertion of the card. On the back surface of the body portion 11 there are arranged a plurality of metal contact pads 13 connected to an IC in the card.

In FIG. 1 and FIG. 2, the card connector 1 has a connector housing 20 molded from an insulating material such as resin. When the connector housing 20 needs a lid, it may be formed integral with the lid or provided with a separate lid.

The IC card 10 is inserted into the connector 1 through a card insertion opening 21 formed in the front of the connector housing 20. The connector housing 20 has a card accommodating portion defined by a pair of side wall portions 22, 23, a bottom plate portion 24 and a rear plate portion 25.

At the bottom plate portion 24 is formed a plurality of grooves 45 for positioning and fixing a plurality of contact terminals 40, The each of contact terminals 40 include power supply terminals and signal terminals. Each of the contact terminals 40 in this embodiment is folded over and has a terminal portion 40a soldered to a corresponding contact pad on a printed circuit board of the electronic device, a fixed portion 40b securely press-fitted in the groove 45, and a contact leaf spring portion 40c elastically displaced to come into contact with the contact pad 13 of the card 10. The contact leaf spring portion 40c has a prominent contact portion 40d.

Contact terminals 40 of these plurality make electrical connection between the card 10 and the electronic device, and the elastic force of the contact leaf spring portion 40c holds the card 10 with an appropriate force when it is loaded.

The bottom plate portion 24 is provided with an elastic braking piece 46 for preventing the card from slipping off when the card is ejected.

Next, a card ejection mechanism, an essential part of the present invention, will be described.

This card ejection mechanism has an ejection member 50, a coil spring 55, an elastic locking piece 60, an ejection button 70, and a plate cam lever 80.

Figure 4:
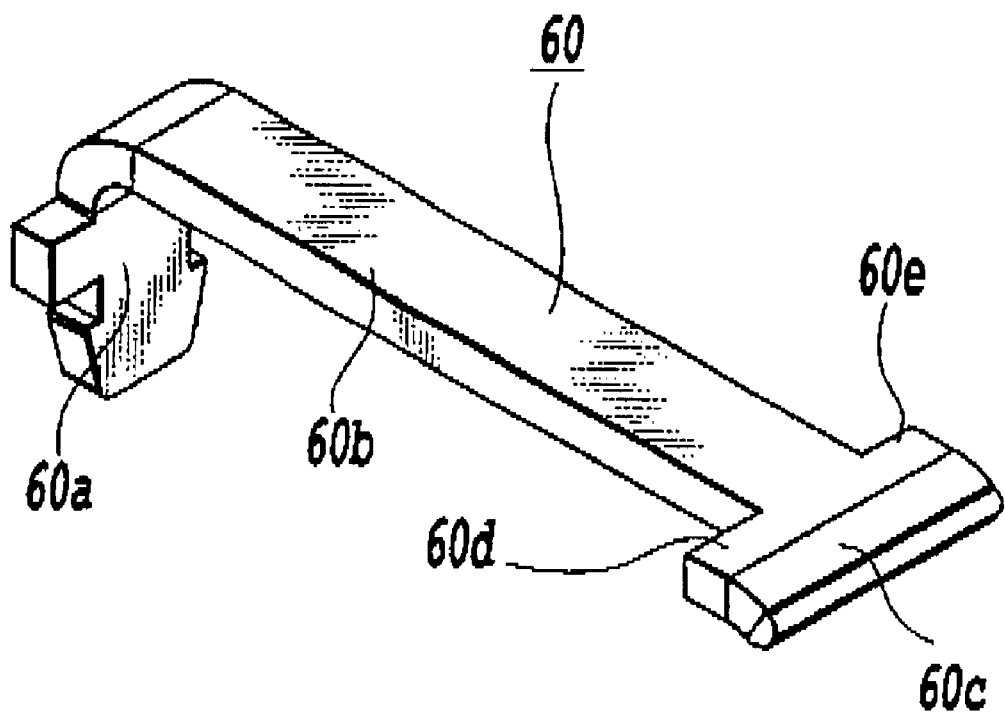
FIG. 4 is a perspective view showing a locking piece used in the card connector of the present invention.
Figure 5:
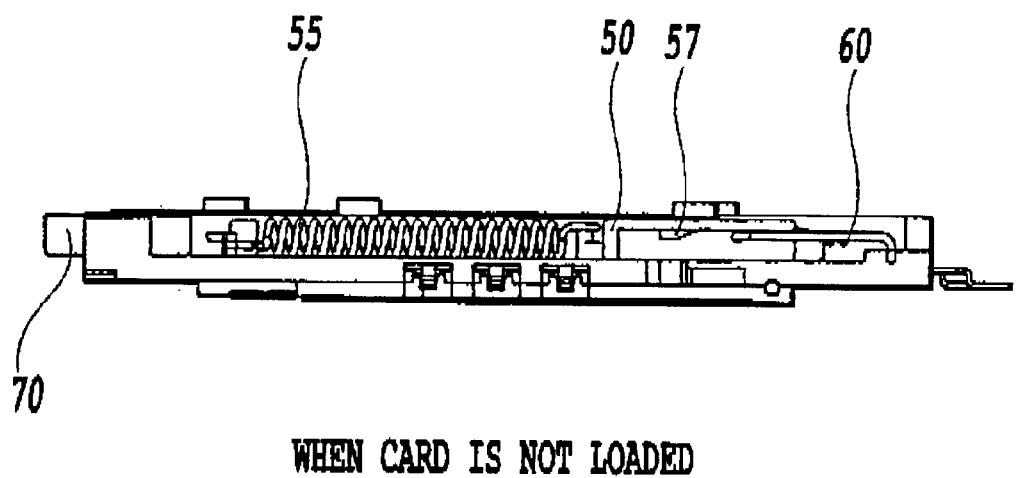
FIG. 5 is a side cross-sectional view showing the condition of the card connector in the embodiment of the present invention before the card is inserted.
Figure 6:
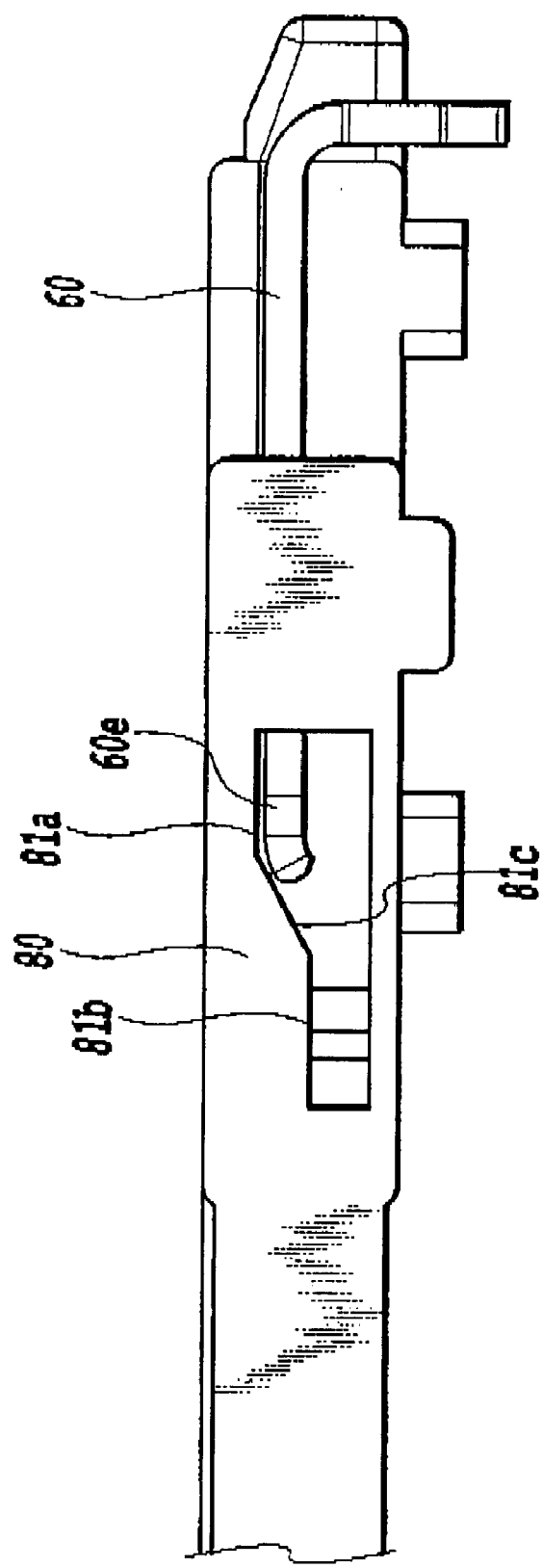
FIG. 6 is a side view showing the condition of the card connector in the embodiment of the present invention before the card is inserted.
Figure 8:
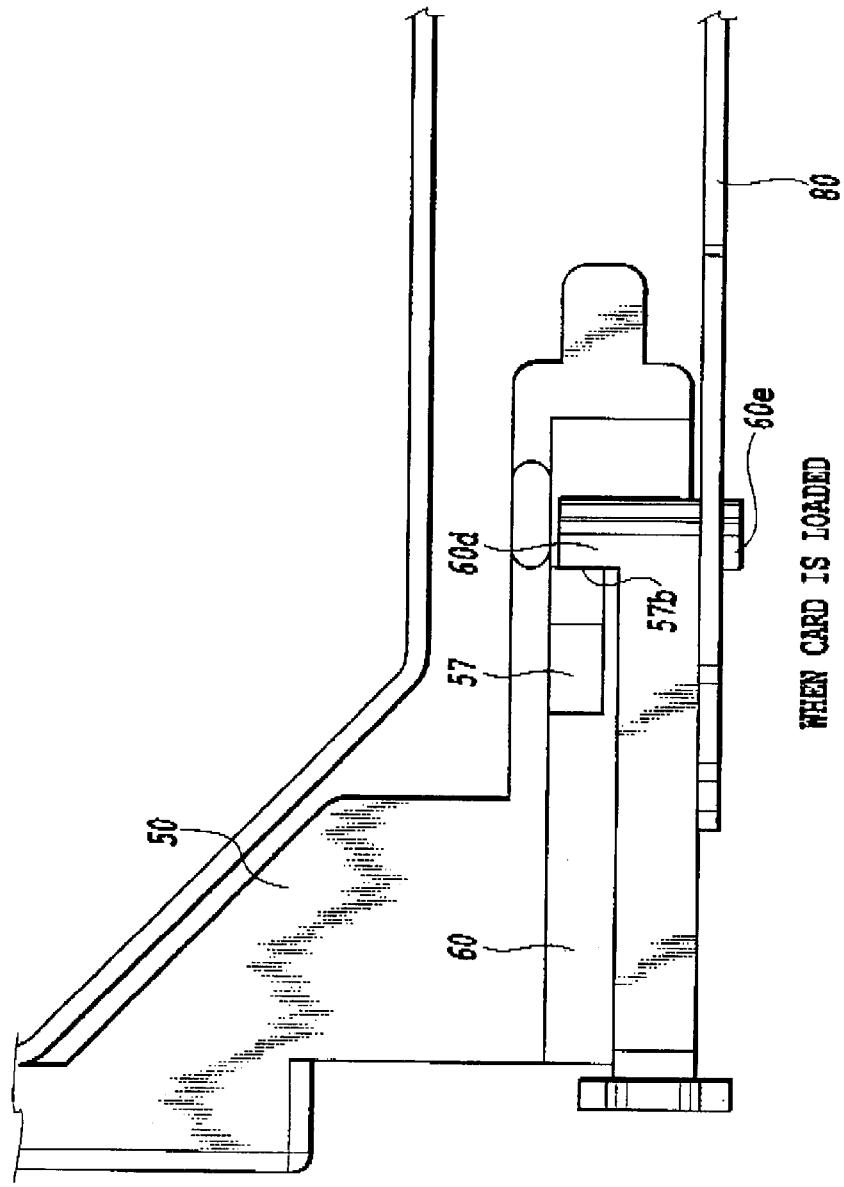
FIG. 8 is a horizontal cross-sectional view schematically showing the condition of the card connector in the embodiment of the present invention when the card is inserted.
Figure 9:
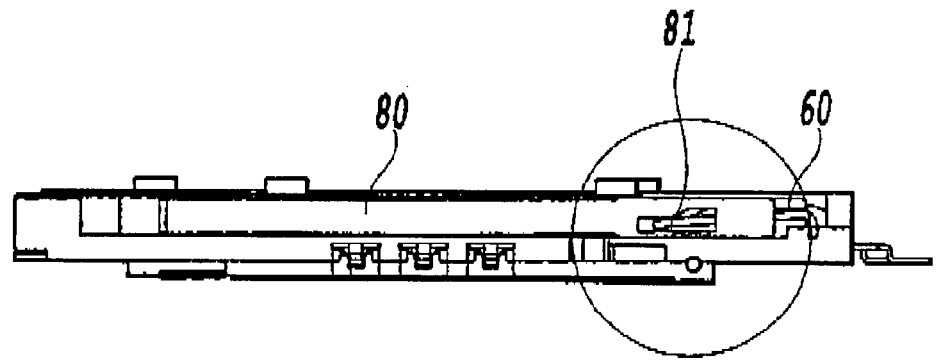
FIG. 9 is a side view showing the card connector in the embodiment of the present invention when an ejection button is pressed.

FIG. 3 is a view showing an essential portion of the ejection mechanism as seen from the back of the connector. FIG. 4 is a view illustrating the elastic locking piece 60. FIG. 5 and FIG. 6 are views illustrating the state of the ejection mechanism when the card is not loaded. FIG. 7 and FIG. 8 are views illustrating the state of the ejection mechanism when the card is loaded. FIGS. 9 to 12 are views illustrating the state of the ejection mechanism when the ejection button is pressed.

As shown in FIGS. 1 to 12, the ejection member 50 is nearly L-shaped and is slidable in a predetermined range of stroke both in card insertion and ejection directions. As shown in FIG. 2, the ejection member 50 is fixed to one end of the coil spring 55 as an elastic member. The other end of the coil spring 55 is secured to a spring catching projection 28 (FIG. 2) formed on the bottom plate portion 24 of the connector housing 20. Hence, the ejection member 50 is urged in the card ejection direction by the coil spring 55.

The ejection member 50 has a card abutment portion 53 against which the front face of the card 10 abuts and a corner wall 54 which the chamfer 12 of the card 10 touches. When a card is inserted, the ejection member 50 is slid in the card insertion direction by the pushing force of the card 10. A portion 56 projected to the direction of the back in the ejection member 50 (FIG. 3) is accommodated in a recessed portion 29 (FIG. 1) formed in the rear plate portion 25 of the connector housing 20 when the card is inserted.

On the bottom side of the ejection member 50 is formed a fixing projection 57 for attaching the elastic locking piece 60 as shown in FIG. 3. The locking projection 57 has a taper portion 57a on its rear side with respect to the housing and a fixing portion 57b on its front side.

The elastic locking piece 60, as shown in FIG. 4, has a fixed portion 60a press-fitted in the connector housing 20, an elastically displaceable spring portion 60b, and a front expanded portion 60c. The elastic locking piece 60 is supported like a cantilever. The elastic locking piece 60 is elastically displaced vertically with respect to the connector housing 20 (in a direction of thickness of the loaded card 10). The side projecting portions 60d (hereinafter referred to as locking portion) at the one side of the front expanded portion 60c is engaged the fixing portion 57b of the fixing projection 57 of the ejection member 50. The other side projecting portion 60e (hereinafter referred to as a cam touching portion) of the front expanded portion 60c comes in contact with a cam surface 81 formed in the plate cam lever 80 and moves almost along the cam surface 81.

The ejection button 70 is attached to the connector housing 20 so that it can be slid in the card insertion and ejection directions by a distance equal to the stroke of the eject operation. The ejection button 70 is urged at all times by a built-in spring (not shown) toward the front of the connector 1 (in the card insertion and ejection direction).

The ejection button 70 has the plate cam lever 80 secured thereto. The plate cam lever 80 is made from a continuous plate material and is slid in the card insertion and ejection directions by a distance of the operation stroke of the ejection button 70 along a groove (not shown) formed in a side edge portion of the connector housing 20. At the plate cam lever 80 is formed a slot having the cam surface 81 with which the cam touch portion 60e of the elastic locking piece 60 is made to come to contact. The movement of the cam surface 81 causes the front expanded portion 60c of the elastic locking piece 60 to move vertically with respect to the housing. The cam surface 81 comprises two surfaces with different heights (a locking surface 81a and a releasing surface 81b) and a taper surface 81c connecting these two surfaces.

Next, the operation of the card connector 1 performed when the card is inserted and ejected will be described.

(Operation when card is inserted)

Before a card is inserted, the ejection member 50 is situated at a predetermined front position spaced from the rear plate portion 25 by the urging force of the coil spring 55, as shown in FIG. 2 and FIG. 5. At this time, the fixing projection 57 of the ejection member 50 is situated in front side of and spaced from the elastic locking piece 60, as shown in FIG. 5.

The ejection button 70 is also situated at a front side position, i.e., on a card insertion slot side, by the elastic force of the built-in spring, so that the plate cam lever 80 is situated in the condition as shown in FIG. 6. That is, the locking surface 81a of the plate cam lever 80 opposes the cam touch portion 60e of the elastic locking piece 60 and thus the elastic locking piece 60 is not elastically displaced.

When in this state the card 10 is inserted into the connector 1, the front end wall and the chamfer 12 of the card 10 press against the card abutment portion 53 and the corner wall 54 of the ejection member 50. The ejection member 50 is therefore slid toward the rear plate portion 25 (on the rear side of the connector) against the force of the coil spring 55.

As the ejection member 50 is moved toward the rear plate portion 25 (in the rearward direction), the locking projection 57 of the ejection member 50 slides from the taper portion 57a to the locking portion 60d of the elastic looking piece 60, so that the locking portion 60d of the elastic locking piece 60 rides over the fixing projection 57. The locking portion 60d, after riding over the fixing projection 57, is attached by the fixing portion 57b of the fixing projection 57, as shown in FIG. 8. As a result, the ejection member 50 is blocked from moving in the card ejection direction.

During the process of inserting the card 10, because the plate cam lever 80 does not move relative to the connector housing 20, the positional relation between the plate cam lever 80 and the elastic locking piece 60 shown in FIG. 6 is maintained.

In this way, the card 10 is loaded into the connector 1.

(Operation when card is ejected)

When, with the card 10 loaded, the ejection button 70 is pressed, the plate cam lever 80 is also slid toward the back of the connector in connection with this. The plate cam lever 80 moves relative to the cam touch portion 60e of the elastic locking piece 60 so that the cam touch portion 60e successively opposes the locking surface 81a, the taper surface 81c and the releasing surface 81b in that order until finally the releasing surface 81b of the cam surface 81 comes in contact with the cam touch portion 60e of the elastic locking piece 60. As a result, the front expanded portion 60c of the elastic locking piece 60 is elastically deflected downwardly of the housing, as shown in FIG. 9 to FIG. 12.

Figure 10:
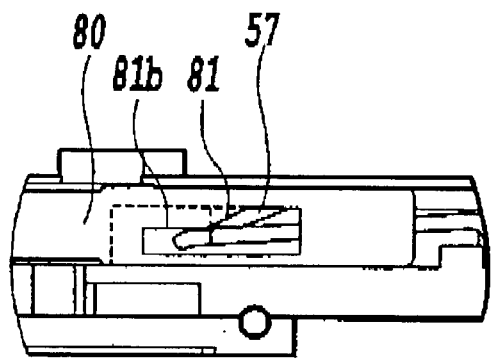
FIG. 10 is a partly enlarged side view showing the condition of the card connector in the embodiment of the present invention when the ejection button is pressed.
Figure 11:
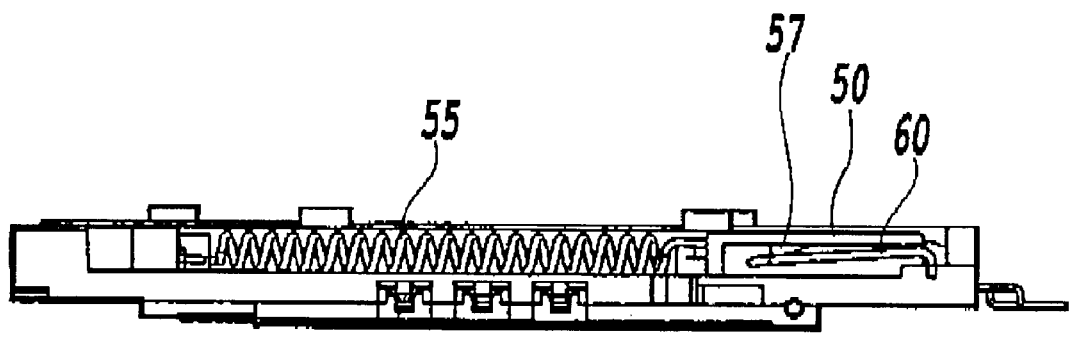
FIG. 11 is a side cross-sectional view showing the card connector in the embodiment of the present invention when an ejection button is pressed.

Hence, as shown in FIG. 10 and FIG. 11, the lock state between the locking portion 60d of the elastic locking piece 60 and the fixing projection 57 of the ejection member 50 is canceled. The ejection member 50 is therefore moved toward the card insertion opening side (front side) of the connector housing 20 by the recovering force of the coil spring 55, ejecting the card 10. The ejection button 70, when released from the pressing operation, is automatically returned to the original position by the recovering force of the built-in spring.

In this way, with this card connector construction, the fixing projection 57 formed on the ejection member 50 and the plate cam lever 80 linked with the ejection button 70 cause the elastic locking piece 60 for locking the ejection member 50 to displace vertically of the connector housing 20 (in the direction of thickness of the card 10) so as to lock and release the ejection member 50. This makes it possible to reduce the width of the connector housing 20 and therefore the mounting area of the connector housing.

Although in the embodiment described above, the ejection member 50 is provided with the fixing projection 57 which the front end of the elastic locking piece 60 is attached, locking the ejection member 50, the locking structure is arbitrary, and any other arbitrary locking structure may be adopted. For example, a hook portion may be provided to the front end of the locking piece 60 and a recessed portion for engagement with the hook portion may be formed on the ejection member 50 side.

Further, while in the embodiment above the ejection operation is done by the ejection button 70, it is possible to eliminate the ejection button 70 and eject the card by performing a push-push operation on the card 10. In this push-push type ejector as shown in Japanese Patent Application Laid-open No 2000-251025, the loaded card is pushed slightly toward the rear plate portion 25 (back side of the connector) to unlock the ejection member and thereby eject the card. In this type of ejector, too, the mounting area of the connector can be reduced by displacing the locking piece for the ejection member vertically of the connector housing.

Further, in the embodiment as described, the coil spring 55 and the spring built into the ejection button 70 are not limited to coil springs but may use any other kind of spring or even an arbitrary elastic body.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A card connector for holding a card in a connector housing in such a way that a plurality of contact pads provided on a bottom surface of said card are in contact with contact terminals arranged in said connector housing, said card connector comprising:

an ejection mechanism having an ejection member, said ejection member being adapted to move in a card insertion direction as said card is inserted into said connector housing, and move in a card ejection direction in response to a card ejection operation to eject said card;

a locking piece displaceable vertically of said connector housing and adapted to fix said ejection member, when said card is loaded, to restrict said movement of said ejection member in said card ejection direction; and releasing means for unlocking said locking piece in response to said card ejection operation, wherein a fixing portion is formed at said ejection member and said locking piece is fixed to said fixing portion when said card is loaded, wherein said ejection mechanism has an ejection button, and said releasing means displaces said locking piece vertically of said connector housing in response to said movement of said ejection button to unlock said locking piece, and wherein said releasing means has a cam surface to displace said locking piece vertically of said connector housing and is a plate cam member connected to said ejection button.

2. A card connector for holding a card in a connector housing in such a way that a plurality of contact pads provided on a bottom surface of said card are in contact with contact terminals arranged in said connector housing, said card connector comprising:

an ejection mechanism having an ejection member, said ejection member being adapted to move in a card insertion direction as said card is inserted into said connector housing, and move in a card ejection direction in response to a card ejection operation to eject said card;

a locking piece displaceable vertically of said connector housing and adapted to fix said ejection member, when said card is loaded, to restrict said movement of said ejection member in said card ejection direction; and releasing means for unlocking said locking piece in response to said card ejection operation, wherein a fixing portion is formed at said ejection member and said locking piece is fixed to said fixing portion when said card is loaded, wherein said fixing portion of said ejection member is formed with a leading taper portion which slides past a locking portion of said locking piece.

3. A card connector according to claim 1, wherein said locking piece has at its one end a locking portion for fixing said fixing portion of said ejection member and a cam touch portion formed adjacent to said locking portion to come to contact with said cam surface of said plate cam member.

* * * * *